US009325444B2

(12) United States Patent
Ubeda Castellanos et al.

(10) Patent No.: US 9,325,444 B2
(45) Date of Patent: Apr. 26, 2016

(54) SCRAMBLING CODE RESOLUTION
(75) Inventors: Carlos Ubeda Castellanos, Madrid (ES); Oscar Muñoz Aragon, Malaga (ES); Javier Romero Garcia, Malaga (ES)
(73) Assignee: Telefonaktiebolaget L M Ericsson (publ), Stockholm (CH)
( * ) Notice: Subject to any disclaimer, the term of this patent is extended or adjusted under 35 U.S.C. 154(b) by 0 days.
(21) Appl. No.: 14/414,184
(22) PCT Filed: Jul. 18, 2012
(86) PCT No.: PCT/EP2012/064112
§ 371 (c)(1),
(2), (4) Date: Feb. 13, 2015
(87) PCT Pub. No.: WO2014/012589
PCT Pub. Date: Jan. 23, 2014

(65) Prior Publication Data
US 2015/0146691 A1 May 28, 2015

(51) Int. Cl.
H04W 36/08 (2009.01)
H04J 13/18 (2011.01)
(Continued)
(52) U.S. Cl.
CPC .............. H04J 13/18 (2013.01); H04L 5/0053 (2013.01); H04W 36/0061 (2013.01); H04W 36/0094 (2013.01); H04W 36/32 (2013.01); H04W 56/001 (2013.01); H04J 2013/0096 (2013.01)

(58) Field of Classification Search
CPC  H04J 13/18; H04J 2013/0096; H04L 5/0053; H04W 36/0061; H04W 36/0094; H04W 36/32; H04W 56/001
See application file for complete search history.

(56) References Cited
U.S. PATENT DOCUMENTS 7,912,011 B2 *  3/2011  Tanno ................... H04B 1/7083
                                                          370/331
2002/0045448 A1 *  4/2002  Park ...................... H04W 36/30
                                                          455/436

(Continued)

FOREIGN PATENT DOCUMENTS

EP      1983786 A1     10/2008
EP      2487957 A1      8/2012
(Continued)

OTHER PUBLICATIONS

Qualcomm Incorporated [RAPPORTEUR], "Report for [e-mail #03]: TP for Rel-11 Macro to IINB hand-in for Legacy UEs". 3GPP TSG RAN WG3 #74, San Francisco, US, Nov. 5, 2011, pp. 1-9, R3-112886, 3GPP.
(Continued)

Primary Examiner — Curtis A Alia
(74) Attorney, Agent, or Firm — Coats & Bennett, P.L.L.C.

(57) ABSTRACT

A code division multiple access wireless network (10) comprises a plurality of base stations (11-14) which operate asynchronously with respect to one another. A set of scrambling codes are allocated to the base stations for scrambling signals transmitted from the base stations. A node (30) of the wireless network receives (102) a first type of measurement report from wireless terminals (20), which comprises an observed time difference measurement acquired by the wireless terminal (20) for a signal received from one of an active set of base stations (11, 12, 13) that currently serve the wireless terminal. A timing reference is determined (103) for each of the base stations using a plurality of the observed time difference measurements. A second type of measurement report is received (105) from a wireless terminal (20) which comprises an observed time difference measurement acquired by the wireless terminal for a signal received from a base station (14) which is not currently serving the wireless terminal and a scrambling code of the received signal. An identity of the base station (14) in the second type of measurement report is determined by using the scrambling code of the signal received from the base station (14) which is not currently serving the wireless terminal and the observed time difference measurement in the second type of measurement report and the determined timing reference for that base station.

18 Claims, 11 Drawing Sheets

(51) Int. Cl.
  *H04W 36/00*  (2009.01)
  *H04L 5/00*  (2006.01)
  *H04W 36/32*  (2009.01)
  *H04W 56/00*  (2009.01)
  *H04J 13/00*  (2011.01)

(56) References Cited

U.S. PATENT DOCUMENTS

| | | | |
|---|---|---|---|
| 2004/0032836 A1* | 2/2004 | Grilli | H04B 7/2668 370/252 |
| 2004/0062300 A1* | 4/2004 | McDonough | H04B 1/7077 375/150 |
| 2010/0150109 A1 | 6/2010 | Bradley et al. | |
| 2010/0203890 A1* | 8/2010 | Nagaraja | H04W 36/0061 455/436 |
| 2012/0163320 A1* | 6/2012 | Akimoto | H04L 5/0051 370/329 |
| 2012/0202505 A1 | 8/2012 | Kondo | |

FOREIGN PATENT DOCUMENTS

| | | |
|---|---|---|
| GB | 2446192 A | 8/2008 |
| WO | 2011043015 A1 | 4/2011 |

OTHER PUBLICATIONS

3rd Generation Partnership Project, "3rd Generation Partnership Project; Technical Specification Group Radio Access Network; Physical layer; Measurements (FDD) (Release 9)", Technical Specification, 3GPP TS 25.215 V9.2.0, Mar. 1, 2010, pp. 1-23, 3GPP, France.

Brunner, C., et al., "Generation of Pathloss and Interference Maps as SON Enabler in Deployed UMTS Networks", IEEE 69th Vehicular Technology Conference: VTC 2009-Spring, Apr. 26, 2009, pp. 1-5, IEEE.

Holma, H. et al., "Downlink Scrambling", WCDMA for UMTS—HSPA Evolution and LTE, Chapter 6, p. 104, Fourth Edition, John Wiley & Sons, Ltd.

Third Generation Partnership Project. "Enhancement of hand-over to small UMTS cells." 3GPP TSG RAN Meeting #55; Xiamen, China; Feb. 28-Mar. 2, 2012; pp. 1-4, RP-120237.

\* cited by examiner

SCRAMBLING CODE RESOLUTION

TECHNICAL FIELD

This invention relates to code division multiple access wireless systems which use scrambling codes to scramble transmitted signals.

BACKGROUND

In a Code Division Multiple Access (CDMA) wireless system, such as Universal Mobile Telecommunications System (UMTS), scrambling codes (SC) are used to distinguish signals transmitted from different wireless base stations.

Wireless terminals measure properties of signals received from surrounding base stations and report the measurements back to the network along with the corresponding scrambling code for each received signal. The measurements reported by wireless terminals are processed by the network. Each measurement reported by a wireless terminal is mapped to a specific and unique cell/sector of the network, using the scrambling code as an identifier of the cell/sector. This process is often called scrambling code resolution. Scrambling code resolution can be performed in real-time by the network during soft handoff using the neighbour (NB) list of the serving cell/sector, or it can be performed off-line in drive tests or call trace processing tools.

A scrambling code is the key to mapping a measurement to a cell/sector of the network. A network typically has a limited set of scrambling codes. For example, in UMTS there are 512 scrambling codes. This means that the same scrambling codes are re-used within a network. With correct network planning, there should only be one cell/sector in the area surrounding a terminal with a particular scrambling code and therefore there should no ambiguity as to which cell/sector that scrambling code corresponds to. However, in real life scenarios situations can arise where there can be more than one cell/sector in the area surrounding a terminal with a particular scrambling code and this causes ambiguity as to which cell/sector that scrambling code corresponds to. If a scrambling code is mapped to an incorrect cell/sector of the network, this can cause problems with handoff, as the network may attempt to handoff the wireless terminal to an incorrect handoff target. This could result in dropped connections.

Many scrambling code resolution strategies rely on neighbour (NB) lists. Network physical information and geometrical rules are used when measured SCs are not included in the NB list, or when the NB list is not available at all. NB list rules can be unreliable, due to missing entries in the NB list. Unable to detect and solve SC collisions. A SC collision can occur when a wireless terminal measures two different cells/sectors that have the same SC. This is typical when there is bad SC planning, which also leads to SHO failures. The use of geometrical rules can have a problem of relying on network topology information which can be incomplete or wrongly populated. For a given SC, a geometrical rule attempts to estimate the sector, having that SC, with the strongest signal level. Even if the topology information is correct, the method is impacted by propagation prediction errors and assumptions. For example, it is not always correct to assume that the closest candidate to the serving sector is the one to be received with strongest signal level. Terrain, antenna tilts, fading, building, etc. may cause that the strongest one is a further away candidate.

US 2010/0150109A1 describes a method of identification of a femtocell base station as a handover target. Each base station is configured such that it transmit a broadcast signal which has different timing information to neighbouring base stations. This is achieved either by a central control node giving different timing offsets to base stations, or by base stations setting a timing offset for themselves. Timing offsets applied to base stations are of the order of a multiple number of frames.

SUMMARY

The present invention seeks to provide an improved way of resolving scrambling codes.

A first aspect of the invention provides a method of processing data reported by wireless terminals in a code division multiple access wireless network. The wireless network comprises a plurality of base stations which operate asynchronously with respect to one another. A set of scrambling codes are allocated to the base stations for scrambling signals transmitted from the base stations. The method comprises, at a node of the wireless network, receiving a first type of measurement report from wireless terminals. Each first type of measurement report received from one of the wireless terminals comprises an observed time difference measurement acquired by the wireless terminal for a signal received from one of an active set of base stations that currently serve the wireless terminal and a scrambling code of the received signal. The method further comprises determining a timing reference for each of the base stations using a plurality of the observed time difference measurements. The method further comprises receiving a second type of measurement report from a wireless terminal which comprises an observed time difference measurement acquired by the wireless terminal for a signal received from a base station which is not currently serving the wireless terminal and a scrambling code of the received signal. The method further comprises determining an identity of the base station in the second type of measurement report by using the scrambling code of the signal received from the base station which is not currently serving the wireless terminal and the observed time difference measurement in the second type of measurement report and the determined timing reference for that base station.

Each of the base stations may provide omni-directional coverage or sectored coverage. In the case of sectored coverage there will typically be one scrambling code allocated to each sector transmitted by a sectored base station. A measurement report (of the first type or the second type) corresponds to one of the sectors transmitted by the base station. The step of determining an identity of the base station determines an identity of one of the sectors of the sectored base station.

An advantage of an embodiment of the invention is that it is possible to more reliably map a measurement to a particular base station by using timing information in addition to the scrambling code. The timing information can be used as a kind of fingerprint to identify cells/sectors in combination with a scrambling code.

Advantageously, the step of determining an identity of the base station in the second type of measurement report is performed for a plurality of candidate base stations having the same scrambling code and a determined timing reference for each of the plurality of candidate base stations.

Advantageously, the step of determining an identity of the base station comprises determining a relative distance for each candidate base station, where the relative distance is a difference between (i) a distance between the terminal and one base station in the active set and (ii) a distance between the terminal and the candidate base station. The method further comprises selecting one of the candidate base stations as being the base station most likely to correspond to the base station in the second type of measurement report on the basis of the determined relative distances.

Advantageously, a timing reference is determined using timing information that is measured and reported by terminals along with the scrambling code. This information is already reported in existing wireless networks (e.g. UMTS) to aid the soft handover process.

Advantageously, embodiments of the invention can be performed without needing to modify the normal operation of base stations. For example, base stations do not need to acquire or exchange information about the timing relationship that exists between them.

Advantageously, a timing reference can be acquired to a chip level accuracy, where a chip in UMTS corresponds to 0.26 μs or 78 m. However, it is possible to operate at a coarser level of accuracy, which has an advantage of allowing less computation and/or a reduced processing time.

Advantageously, the step of determining a timing reference comprises collecting observed time difference measurements over a time period. The step of determining a timing reference further comprises determining an average value of the observed time difference measurements to provide a difference between timing references for respective pairs of base stations. The step of determining a timing reference further comprises determining a timing reference for each of the base stations using the average values of the differences between timing references of the base stations.

Advantageously, each observed time difference measurement in the first type of measurement report comprises a difference between a signal received from one of the active set of base stations that currently serve the wireless terminal and a local timing reference of the terminal and the step of determining a timing reference comprises collecting observed time difference measurements over a time period. The step of determining a timing reference further comprises determining, for a pair of base stations, a difference between observed time difference measurements for that pair of base stations. The step of determining a timing reference further comprises determining an average value of the difference between observed time difference measurements to provide a difference between timing references for that pair of base stations. The step of determining a timing reference further comprises determining a timing reference for each of the base stations using the average values of the difference between timing references of the base stations.

Advantageously, the step of determining a reference time difference comprises collecting measurements received from a plurality of different wireless terminals.

Another aspect of the invention provides apparatus for use at a node of a code division multiple access wireless network comprising a plurality of base stations which operate asynchronously with respect to one another. A set of scrambling codes are allocated to the base stations for scrambling the transmissions of the base stations. The apparatus comprises an interface which is arranged to receive a first type of measurement report from wireless terminals. Each measurement report received from one of the wireless terminals comprises an observed time difference measurement acquired by the wireless terminal for a signal received from one of an active set of base stations that currently serve the wireless terminal and a scrambling code of the received signal and a second type of measurement report from a wireless terminal which comprises an observed time difference measurement acquired by the wireless terminal for a base station which is not currently serving the wireless terminal and a scrambling code of the received signal. The apparatus further comprises a processor which is arranged to determine a timing reference for each of the base stations using a plurality of the observed time difference measurements in the first type of measurement report and to determine an identity of the base station in the second type of measurement report by using the scrambling code of the received signal and the observed time difference measurement in the measurement report and the determined timing reference for that base station.

The apparatus can further be arranged to implement any of the features of the described or claimed methods.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
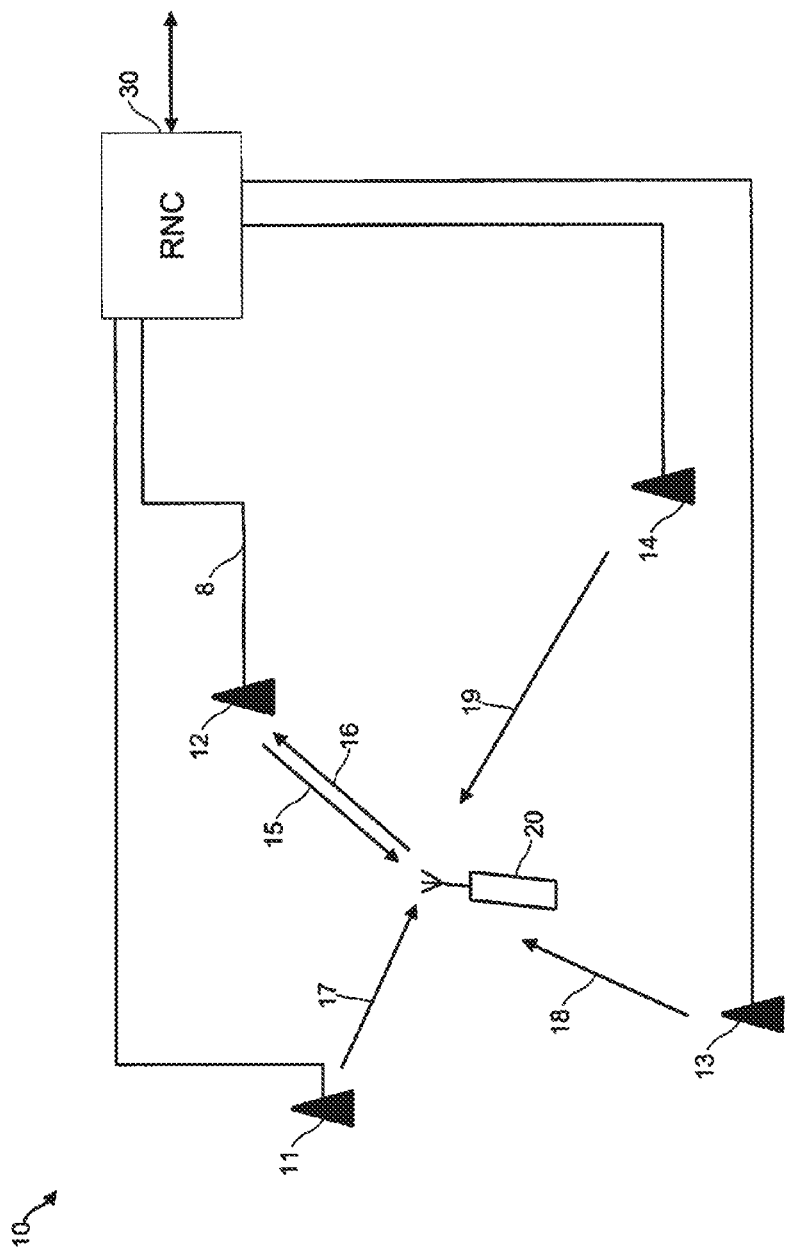
FIG. 1 shows a wireless network in which an embodiment of the invention can be performed.

FIG. 1 shows a wireless network 10 in which an embodiment of the invention can be performed. Network 10 comprises multiple base stations 11-14 deployed across a geographical area. Each of the base stations 11-14 can support wireless communication with a wireless terminal 20 positioned within a coverage area of the base station. Each of the base stations 11-14 may provide omni-directional coverage or sectored coverage. Base stations 11-14 are connected 8 to control nodes 30 of the fixed network infrastructure. In UMTS terminology, network 10 is called a Radio Access Network (RAN), each of base stations 11-14 is called a Node B, a control node 30 connected to a group of Node Bs is called a Radio Network Controller (RNC) and a wireless terminal is called a User Equipment (UE). The network 10 shown in FIG. 1 is a code division multiple access (CDMA) system. Each signal transmitted by a base station is scrambled using one of a set of scrambling codes (SC). Ideally, a scrambling code would be a unique code which uniquely identifies a particular transmitter within the network but, in a practical system, the scrambling code is one of a finite set of scrambling codes used within the system. UMTS has a set of 512 scrambling codes. For a network 10 in which a base station 11-14 is sectored, each sector of a base station is allocated a different scrambling code so that the scrambling code can be used to identify the sector.

Figure 2:
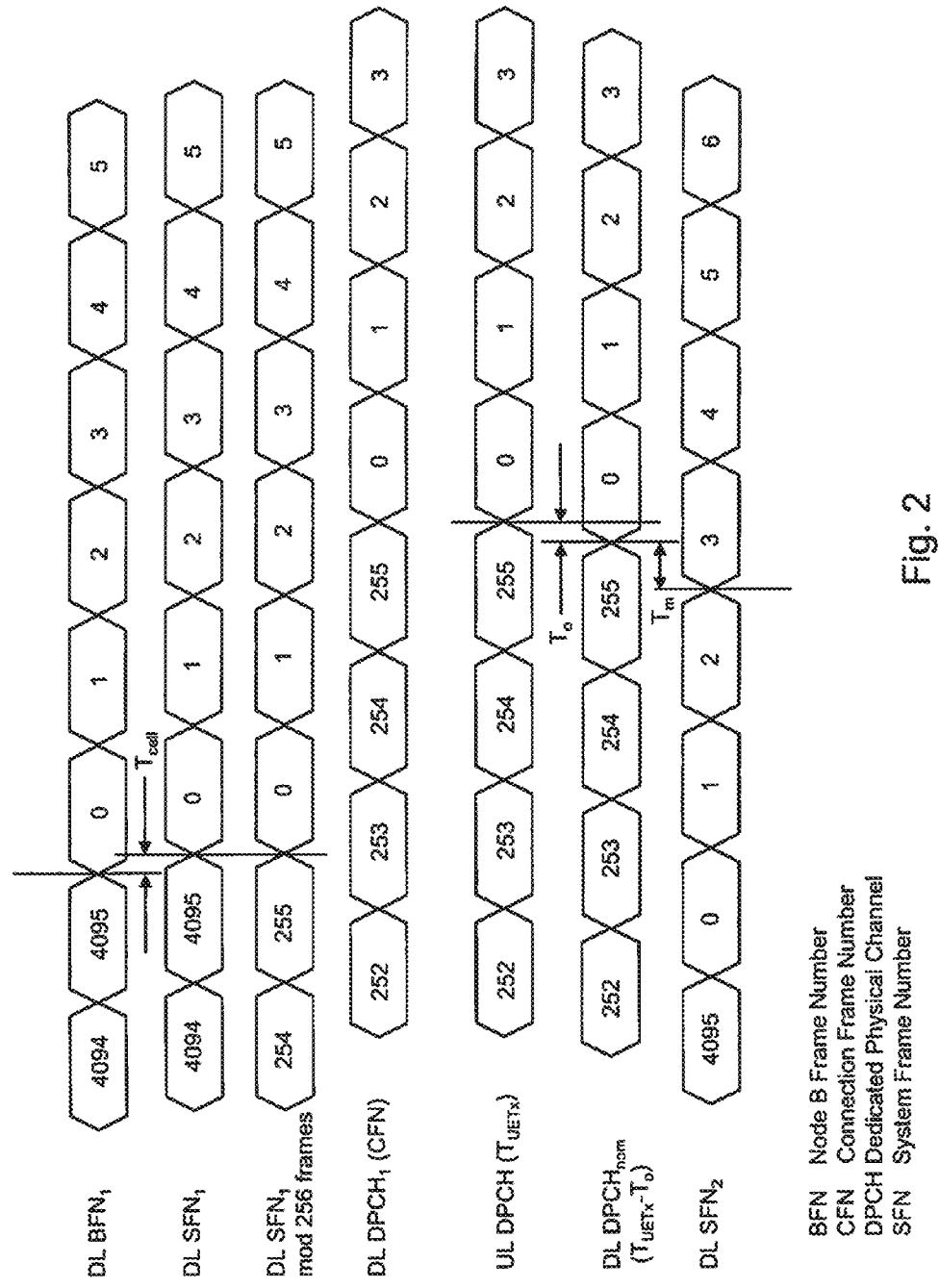
FIG. 2 shows some of the channels transmitted on a FDD-based Radio Interface of a UMTS system.

In operation, a wireless terminal 20 measures properties of one or more signals 15, 17-19, received from base stations 11-14. Measurements are reported by sending 16 measurement reports (MR) on the uplink to the serving base station. For a UMTS system, ETSI TS 125 215 "Universal Mobile Telecommunications System (UMTS); Physical layer Measurements (FDD)" describes measurement abilities of wireless terminals. A wireless terminal can measure received signal strength of one or more signals, such as the Primary Common Pilot Channel (CPICH) transmitted by a base station. A wireless terminal can also measure one or more timing related properties, such as System Frame Number (SFN)– Connection Frame Number (CFN) observed time difference and/or SFN-SFN observed time difference. FIG. 2 shows some of the channels transmitted on a FDD-based Radio Interface of a UMTS system. The SFN-CFN observed time difference is, for a particular base station, an observed time difference of arrival (OTDOA) between a signal received from that base station and an internal reference at which the terminal transmits. The SFN-CFN observed time difference is called $T_m$, and is defined as:

$$T_m = (T_{uETx} - T_o) - T_{RxSFN}$$

where:

$T_{UETx}$ is the time when UE transmits an UL Dedicated Physical Channel;

$T_o$ is the nominal difference between the first received DPCH finger and $T_{UETx}$ $T_{RxSFN}$ is the time at the beginning of the neighbouring Primary Common Control Physical Channel (P-CCPCH) frame received most recent in time before the time instant $(T_{UETx} - T_o)$ in the UE.

The quantity $T_m$ is shown in FIG. 2 between DL DPCHnom $(T_{UETx} - T_o)$ and DL $SFN_2$. In this example the time instant $T_{RxSFN}$ is the start of DL frame number 3.

The time-related quantity $T_m$ described above is one possible time-related quantity which can be used in an embodiment of the invention, and the following detailed description makes use of this quantity. However, it is possible to use another time-related property, such as SFN-SFN observed time difference defined in ETSI TS 125 215.

In a Frequency Division Duplexed (FDD) type of CDMA system, uplink and downlink transmissions are carried by different frequency bearers. Base stations operate in an asynchronous manner. That is, the timing of transmissions of base stations are not synchronised with one another. This means that there can be a difference between the time at which one base station transmits a start of a frame and the time at which another base station transmits a start of a frame. In accordance with embodiments of the invention, the timing relationship between base stations is used as a way of assisting the process of mapping measurement reports to base stations. Instead of relying on the scrambling code as a way of identifying base stations, timing information is also used to help identify the correct base station candidate.

Figure 3A:
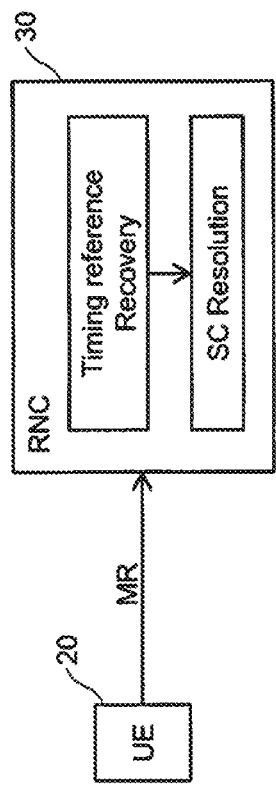
FIGS. 3A and 3B respectively show a real-time embodiment and an off-line embodiment of the invention.
Figure 3B:
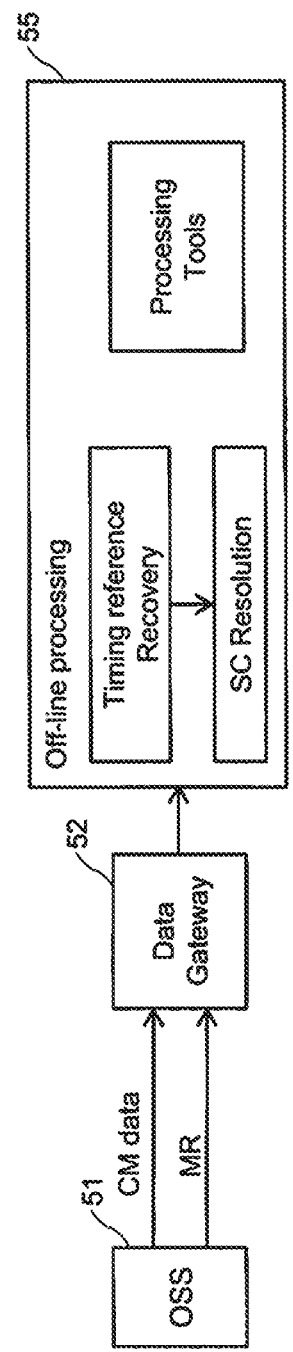

It is possible to implement a real-time embodiment of the invention where measurements are used to make real-time operational decisions in the network. This is shown in FIG. 3A. It is possible to implement an off-line embodiment of the invention where measurements are acquired from call traces or drive tests is used to assess performance of the network. This is shown in FIG. 3B.

Figure 4:
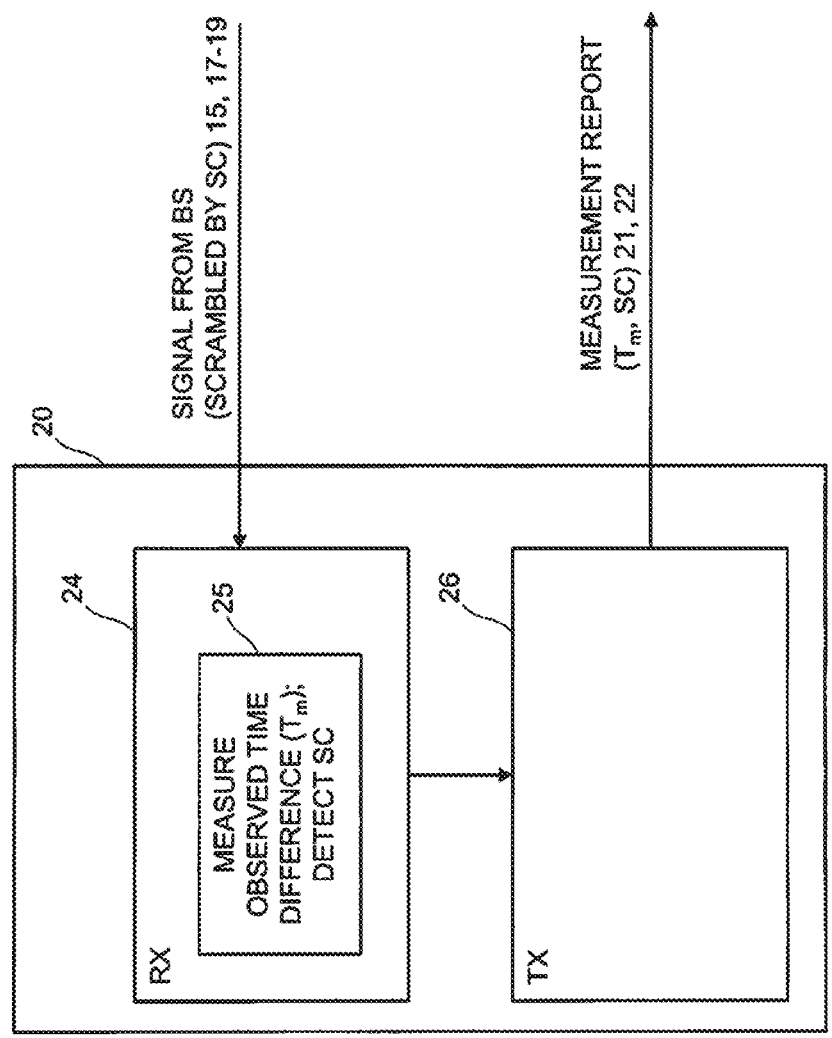
FIG. 4 schematically shows a wireless terminal.
Figure 5:
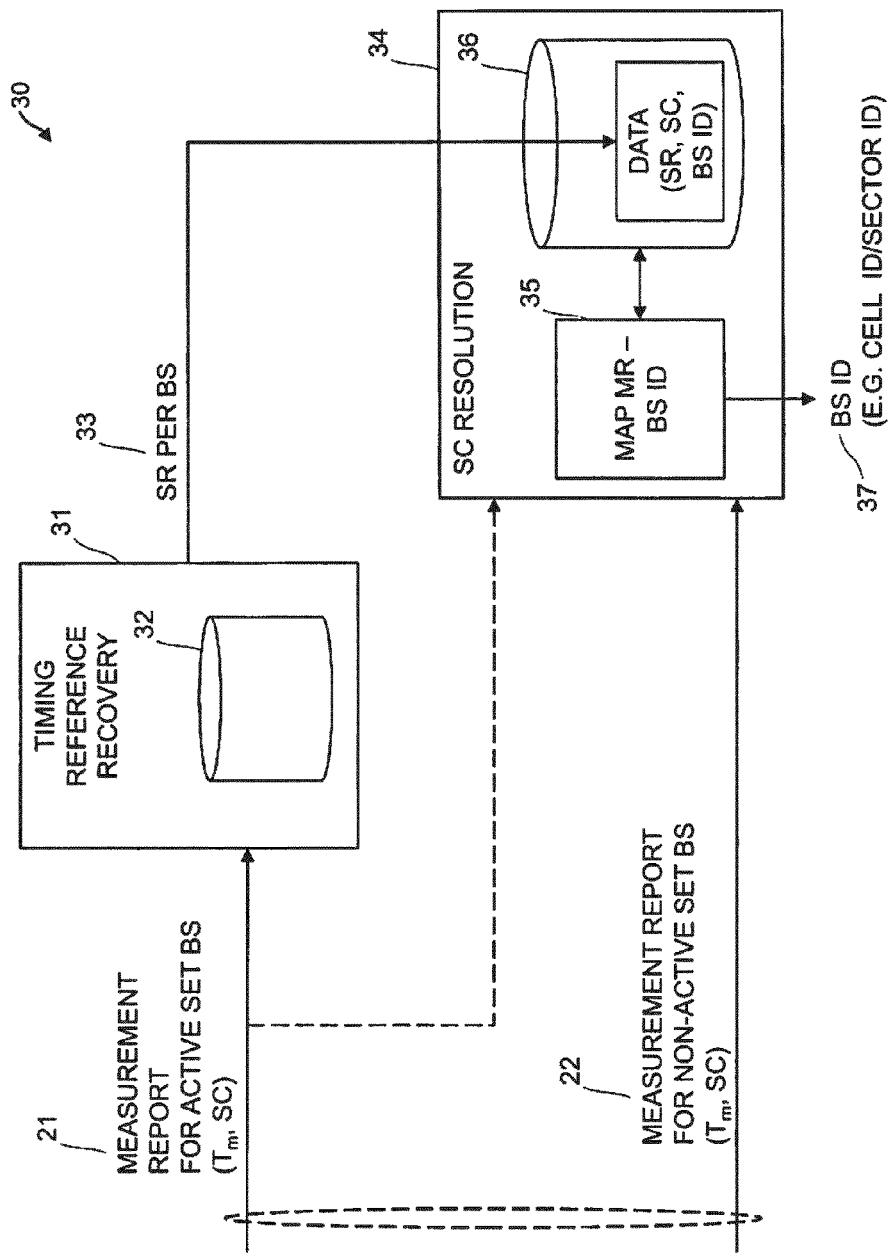
FIG. 5 schematically shows a node in the radio access network, such as a RNC.

An embodiment which operates in real-time will be described in detail, with reference to FIGS. 4 and 5. FIG. 4 shows a wireless terminal 20. FIG. 5 shows a node of the RAN, such as a RNC 30.

FIG. 4 shows a wireless terminal 20. The terminal comprises a receive section 24 for receiving wireless (e.g. radio) signals from base stations and a transmit section 26 for transmitting wireless signals. Each signal received by the terminal can be one of the signals 15, 17-19 shown in FIG. 1. Each signal is scrambled by a scrambling code. As explained above, each received signal should be scrambled by a different scrambling code. A module 25 within the transmitter measures a time-related property of the received signal, such as the observed time difference $T_m$ as defined above. Module 25 also detects the scrambling code that was used to scramble the signal 15, 17-19. The outputs of unit 25 are forwarded to a transmit section of the terminal. The transmit section 26 forms, and then transmits, a measurement report 21, 22. The measurement report comprises a measurement of the observed time difference $T_m$, and an identification of the scrambling code SC detected. There are two types of measurement report. A first type of measurement report is a measurement report made for a base station forming part of the active set of base stations serving the terminal. This is a base station that the terminal is actively in communication with, such as one of the base stations that the terminal is in soft handoff with. A second type of measurement report is a measurement report made for a base station which does not form part of the active set of the terminal. For example, it can be a base station that is within suitable range of the base station to permit the terminal to make a measurement, but which the terminal is not yet in two-way communication with. In the case of a sectored base station, the measurement report will be a measurement of a channel received from one of the sectors transmitted by the sectored base station. A terminal may measure multiple signals received from a single base station, each of the signals being scrambled by a different SC and may send a measurement report for each of a plurality of different sectors of a base station.

FIG. 5 shows functionality which can be performed at the RNC 30. A purpose of the process is to reliably map a signal received by a terminal 20 to a base station (cell/sector) 11-14 of the network which transmitted that signal, based on the scrambling code detected by the terminal. The process of FIG. 5 uses timing information as part of the mapping. A first part of the process determines a timing reference for each base station in the network. A Timing Reference Recovery module 31 receives the first type of measurement reports 21 from terminals. As described above, these are measurement reports 21 made in respect of base stations (cells/sectors) which form part of the active set of the terminal. Each measurement report comprises an observed time difference measurement $T_m$ and an indication of the scrambling code SC which was used to scramble the signal. Timing Reference Recovery module 31 collects information from measurement reports 21 received over a period of time from a plurality of terminals within the network. Data is stored in a store 32. Timing Reference Recovery module 31 determines a timing reference for each base station (11-14 in FIG. 1) and outputs this information 33 to a Scrambling Code resolution module 34. The first type of measurement reports are deemed to represent a reliable mapping between SC and base station (cell/sector) because communication messages are transferred between a terminal and a base station before a base station is included in the active set. As this communication must have completed successfully, we can assume that the network has not failed in the SC resolution and the SC identified in the measurement report is reliable.

A Scrambling Code resolution module 34 receives the second type of measurement reports 22. As described above, these are measurement reports 22 made in respect of base stations (cells/sectors) which do not yet form part of the active set of the terminal. Each measurement report comprises an observed time difference measurement $T_m$ and an indication of the scrambling code SC which was used to scramble the signal. A module 35 maps the measurement report 22 to a base station (cell/sector) ID using the scrambling code and timing information. Module 34 may also use a first type of measurement report 21 as a reference for the SC resolution. In this case, the first type of measurement report 21 will be from the same terminal that provides report 22. Module 35 outputs an identifier of the base station in the second type of measurement report. The identifier can be in the form of a cell ID, or a sector ID in the case of a sectored base station. Operation of the timing reference recovery module 31 and SC resolution module 34 is described in more detail below.

As described above, according to 3GPP a value of $T_m$ sent from a given terminal that reports sector i can be expressed (in chips) as:

$$T_m = (T_{UETx} - T_O) - T_{RxSFN}$$

or as:

$$T_m[i] = Q + S_R[i] - d[i] \quad (1)$$

where: $T_m[i]$ is ranged between [0,38399];

Q is the internal time reference of the terminal, which is the quantity $(T_{UETx} - T_O)$;

$S_R[i]$ is the timing reference at the sector i;

d[i] is the distance between the terminal and sector I; and $d[i] - S_R[i] = T_{RxSFN}$.

Referring to FIG. 5, the relative distance between sectors i and j can be written as:

$$d[i,j] = S_R[i,j] - T_m[i,j] \quad (2)$$

where operator $X[i,j] = X[i] - X[j]$. The values $T_m[i]$ and $T_m[j]$ are known from the measurement reports received from a terminal. The values $S_R N$ and $S_R[j]$ are known from module 31 FIG. 5. The relative distance is limited to a range of twice the inter-site distance (ISD), so this range cannot exceed more than a few hundred chips.

Consider that a first type of measurement report is received in respect of a BS that has a confirmed relationship (i.e. because it forms part of the active set) and a second type of measurement report is received in respect of a BS that has several potential candidates. Also consider that timing reference is known for each BS. It is highly unlikely that two cells/sectors with the same SC have the same timing reference. Therefore, it is possible to discard the wrong candidates with no knowledge of the actual sector location, as the wrong candidates will have a relative distance, from equation (2), which exceeds a reasonable value.

Figure 7:
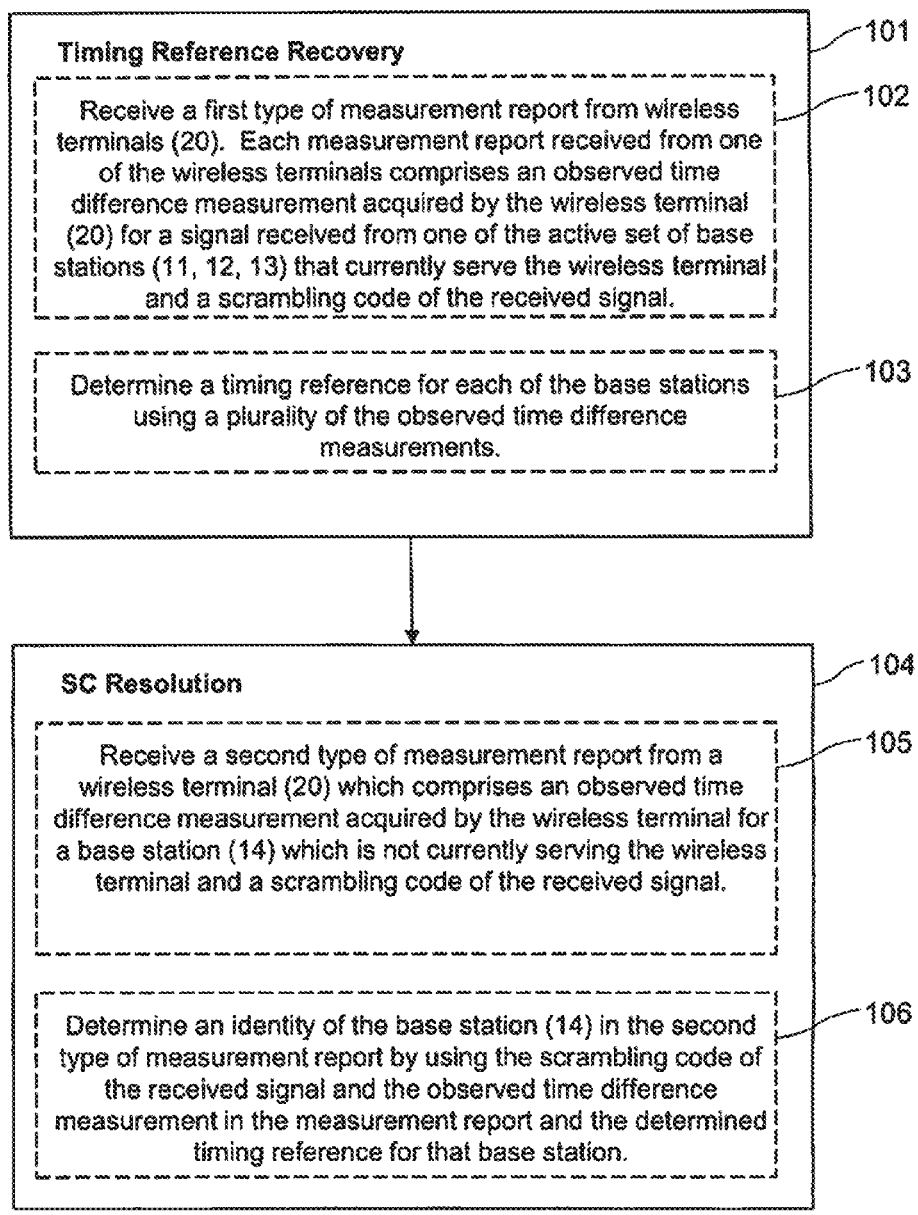
FIG. 7 shows a method including steps of timing reference recovery and scrambling code resolution.

FIG. 7 shows a method performed by a node such as a RNC 30. SCs appearing in the active-set can be securely mapped to corresponding cells/sectors, without relying on any other information. MRs may include other SCs, since terminals are continuously measuring not only sectors in SHO, but also their defined neighbours and any other strong enough signal. Therefore, this initial assignment is rather limited but necessary as a starting point for SR recovery prior to apply the time-delay based SC resolution algorithm. In this document, measurement reports made in respect of BSs forming part of the active set are called a first type of measurement report. Stage 101 of the method is called Timing Reference Recovery, as it finds a timing reference for each base station. The timing reference is an internal clock value which is different for each base station site. This stage of the method estimates the clock value prior to the stage 104 of time-delay based SC resolution. Stage 101 is not trivial since, in order to derive the timing reference for the sites reported in a given MR, the location of the UE (which is unknown) would be needed. However, it is possible to assume that the timing reference keeps a trend over time, and hence information of multiple MRs can be combined to derive the timing reference. Step 102 receives a first type of measurement report from wireless terminals 20. Each measurement report received from one of the wireless terminals comprises an observed time difference measurement acquired by the wireless terminal 20 for a signal received from one of the active set of base stations 11, 12, 13 that currently serve the wireless terminal and a scrambling code of the received signal. Each measurement report is made in respect of a signal of a cell/sector transmitted by the base station.

Step 103 determines a timing reference for each of the base stations using a plurality of the observed time difference measurements. Measurement reports reporting the same sectors within a base station site can be grouped in order to increase the statistical population for recovering the timing reference of the site, as follows:

$$T'_M[i_s] = \frac{1}{k} \sum_{i=1}^{k} T_M[i] + 256 \cdot T_{cell}[i] \quad (3)$$

where:

$T'_m[i_s]$ is the normalized TM;

$i_s$ is the site to which sector i belongs;

k is the number of different sectors reported from site $i_s$ in the MR of study; and $T_{cell}$ is a known network parameter that relates the timing reference of the different sectors within a site.

Figure 8:
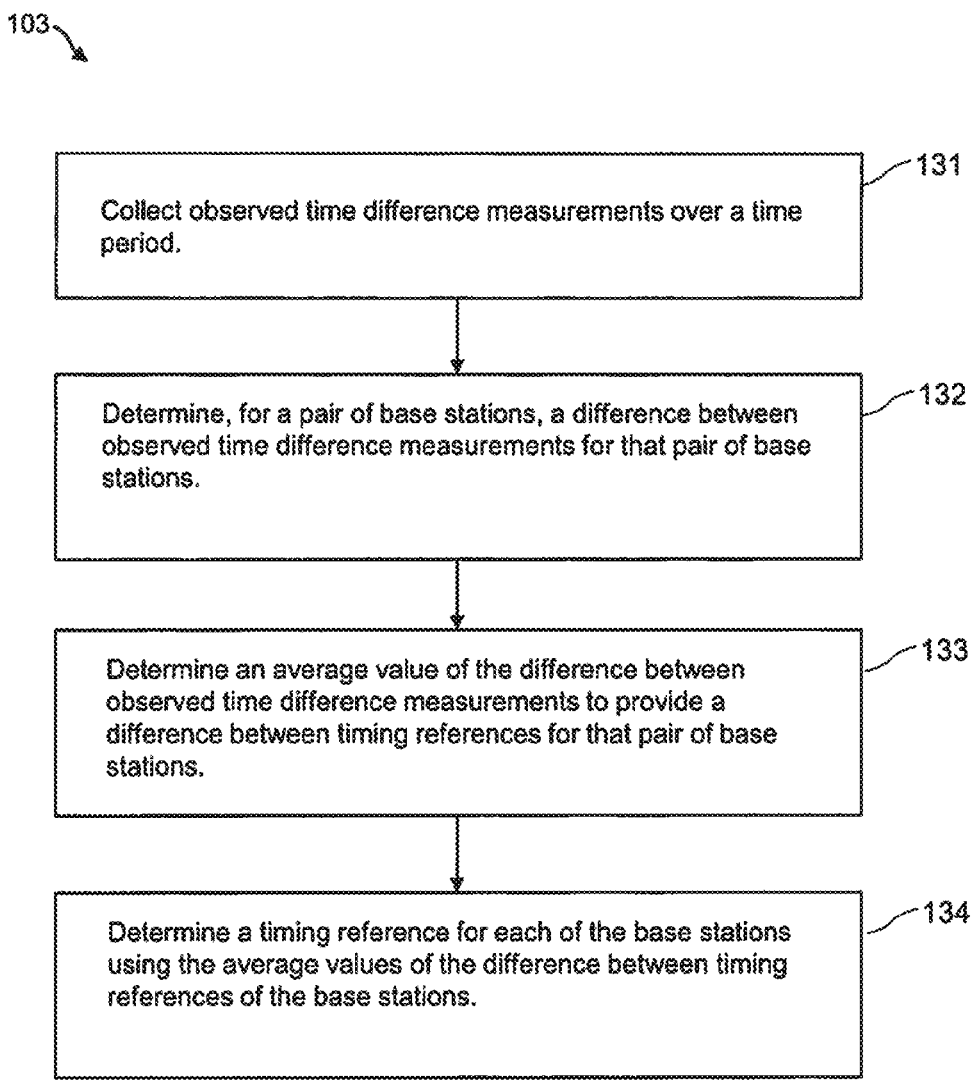
FIG. 8 shows more detail of the step of timing reference recovery of FIG. 7.
Figure 9:
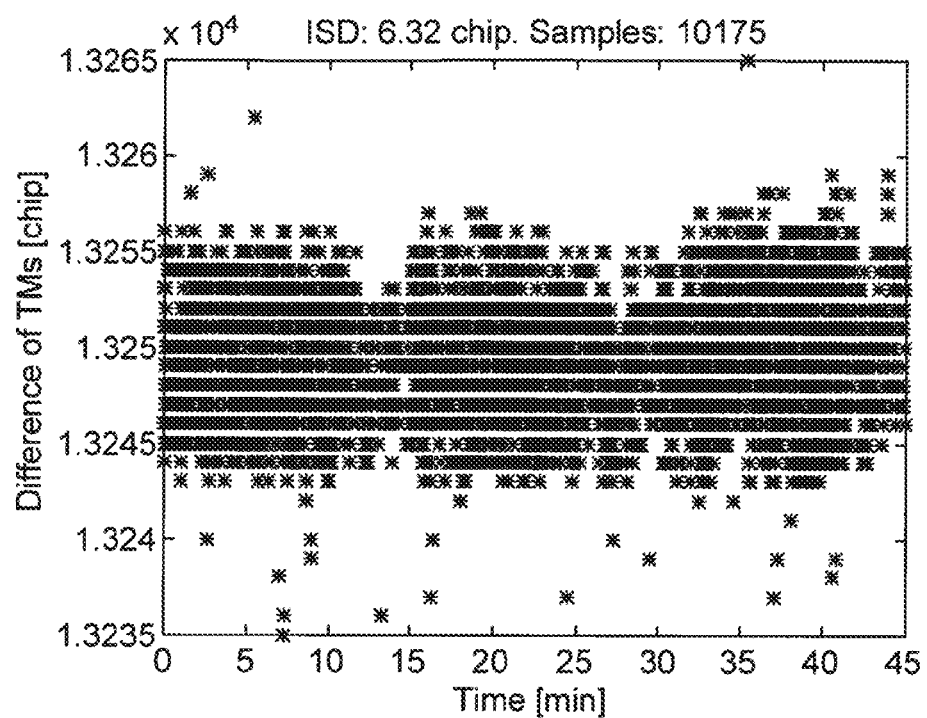
FIG. 9 shows a set of data acquired from measurement reports received from terminals.

In an embodiment, the quantity $T_m$ measured by a terminal represents an observed time difference between a signal received from one of the active set of base stations (11, 12, 13) that currently serve the wireless terminal and a local timing reference of the terminal. FIG. 8 shows more detail of the step 103 of determining a timing reference for each of the base stations. Step 131 collects measurement reports over a period of time. Step 132 determines, for a pair of base stations, a difference between observed time difference measurements for that pair of base stations. FIG. 9 shows a graph plotting a large number of values of the difference between observed time difference measurements reported by terminals for one pair of base stations. The difference between the timing references of the pair of base stations can be estimated as an average value (e.g. a median value) of the distribution of values. This is shown in step 133. This estimation holds if it is assumed there are enough measurement reports reporting the two sites of study, and those measurement reports come from terminals that are widely distributed across the coverage area. The plot of FIG. 9 has a bandwidth of twice the inter-site distance (ISD) and is centred on the relative timing reference, i.e. the difference between the timing reference of one site and the timing reference of the other site. The relative timing reference for a pair of sites $i_s$ and $j_s$ can be written as:

$$s_R[i_s,j_s] = T_M[i_s,j_s] + d[i_s,j_s] \quad (4)$$

Figure 10:
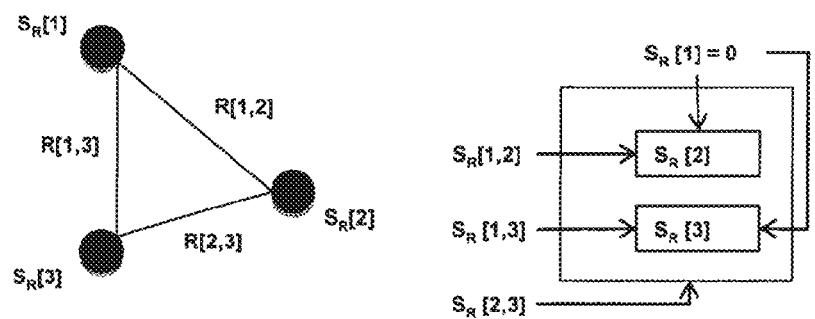
FIG. 10 shows timing relationship between a set of base stations.

Step 134 determines a timing reference for each of the base stations using the average values of the difference between timing references of the base stations. FIG. 10 shows that this problem can be represented as a graph, where each base station site is a node of the graph, and the weight of each arc is the reliability of the relative timing reference between sites. Reliability of the relative timing reference for each pair of sites can be proportional to the number of samples used to estimate the relative timing reference. For example, a sample size of 10,000 samples gives a higher reliability than a sample size of 1,000 samples. There are multiple paths to reach each node of the graph, so there is an amount of redundant information. For example, the relative difference $S_R[2, 3]$ is not necessary to estimate the timing reference $S_R[2]$ or the timing reference $S_R[3]$. However, not all paths of the graph are equally trustworthy, so the algorithm provides a timing reference for each site using the path with highest reliability following a tree-shaped algorithm. Note that one of the sites (in this case site 1, $S_R N$) is used as reference and set to a value of zero. To illustrate operation, assume there are sites, whose relative timing references obtained from bands of measurements (FIG. 9) have been estimated as S[1,2], S[2,3] and S[1,3]. Taking site 1, S[1], as a reference then we have an overdetermined system with three equations and two unknowns: S[2], S[3]. Not all of the relative timing references are equally reliable. A reliability of each of the relative timing reference measurement is determined. The reliability of the relative timing reference between sites 1 and 2 is R[1,2], and similarly there is a reliability for sites 1 and 3, R[1,3], and a reliability for sites 2 and 3, R[2,3]. Assume there are measurements:

S[1,2]=−500=37900 (in mod 38400)
S[1,3]=−300=38100 (in mod 38400)
S[2,3]=200

Taking site 1 as the reference, we set S[1]=0. Then:
S[2]=S[1,2]+S[1]=500, and
S[3]=S[1,3]+S[1]=300.

In this simple example there are no estimation errors so the values obtained for S[2] and S[3] are the same as the values that would have been obtained using relative measurement S[2,3]. In a real case, some estimation errors would occur, and a fitting algorithm can be applied, such as a most-reliable path algorithm or a weighted least squares algorithm.

Returning to FIG. 7, the timing references for each site determined in the first stage 101 are then used to resolve scrambling codes in stage 104. In summary, stage 104 aims to assign sectors to all those measurement reports 22 of the second type with scrambling codes that have been reported for base stations (cells/sectors) not belonging to the active-set of the reporting terminal, by comparing the time-delay measurements with the recovered timing reference. The right candidate is expected to be the one with the smallest relative distance.

Step 105 receives a second type of measurement report from a wireless terminal 20. The report comprises an observed time difference measurement acquired by the wireless terminal for a base station which is not currently serving the wireless terminal. The report also comprises a scrambling code of the received signal. The measurement report is made in respect of a signal of a cell/sector transmitted by the base station.

Step 106 determines an identity of the base station 14 in the second type of measurement report by using the scrambling code of the received signal and the observed time difference measurement in the measurement report and the determined timing reference for that base station.

Step 106 can determine an identity of the base station (cell/sector) in the second type of measurement report for each of a plurality of candidate base stations (cells/sectors) having the same scrambling code, using a determined timing reference for each of the plurality of candidate base stations.

Figure 11:
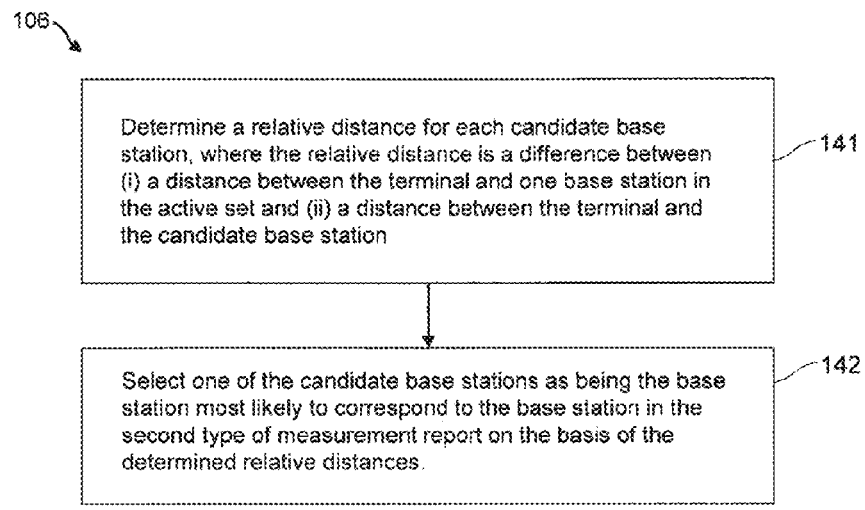
FIG. 11 shows more detail of the step of scrambling code resolution.

FIG. 11 shows additional detail of step 106 of FIG. 7. Step 106 can comprise a step 141 of determining a relative distance for each candidate base station, where the relative distance is a difference between: (i) a distance between the terminal and one base station in the active set; and, (ii) a distance between the terminal and the candidate base station. Step 141 uses equation (2) described above. Step 142 then selects one of the candidate base stations as being the base station most likely to correspond to the base station (14) in the second type of measurement report on the basis of the determined relative distances. Typically, the lowest value of relative distance is indicative of the correct candidate base station.

Some worked examples are provided to illustrate operation of the method.

EXAMPLE 1

A node (e.g. RNC 30) receives a first type of measurement report (MR) that reports scrambling code (SC)=450. It is known that SC=450 belongs to a sector of the Active-set so it is assured that it is sector 254. The node also receives a second type of measurement report (MR) that reports scrambling code (SC)=48. There are two possible candidates with SC=48. The candidates are sector 751 and sector 79.

Figure 6:
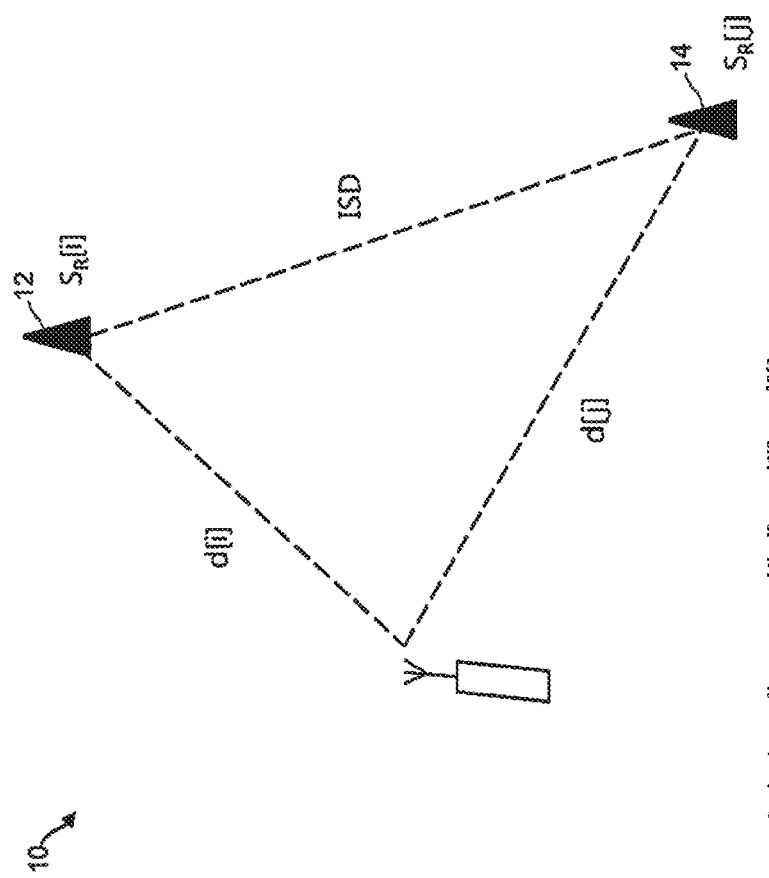
FIG. 6 shows a relationship between a terminal and two base stations.

A timing reference is known for each of sectors 254, 751 and 79 (obtained by the timing reference recovery step 101, FIG. 6). The MRs received from the terminal carry values of $T_m$ for SC=450 and SC=48. The timing reference for sector 254=10000 chips. The timing reference for sector 751=500 chips. The timing reference for sector 79=9351 chips. The value of $T_m$ for SC=48 is 2852 chips. The value of $T_m$ for SC=450 is 3500 chips.

Applying equation (2) above:

$$d[i,j] = s_R[i,j] - T_m[i,j] \quad (5)$$

Candidate sector=751 d[i,j]=(100006−500)−(3500−2852)=9500−648=8852 chips.

Candidate sector=79 d[i,j]=(10000−9351)−(3500−2852)=649−648=1 chip.

The relative distance is 8852 chips if sector 751 is considered as the target, or a relative distance of 1 chip if sector 79 is considered as the target. A relative distance of 8852 chips=8852*78.125 m=69.156 km. A relative distance of 1 chip=78.125 m. Accordingly, the target sector is the sector with the lowest relative distance, which is sector 79.

TABLE 1

Example of missing NBs

| Reference | | | Candidate | | |
|---|---|---|---|---|---|
| SC | Sector | NB | SC | Sector | Relative Distance [chip] |
| 450 | 254 | 751 | 48 | 751 | 8852 |
| | | | 48 | 79 | 1 |

An advantage of the method described above is that there is no need for physical location information, so that issues derived from inaccuracies on sector location are avoided. In the example of Table 1 above, SC=48 has two candidates, sectors 751 and 79. However, only sector 751 is included in the NB list of the reference sector 254. By comparing the relative distance between the two candidates and the reference sector, it becomes clear that sector 79 is the right choice. However, relying only on NB list data would have led to a wrong decision.

EXAMPLE 2

Figure 12:
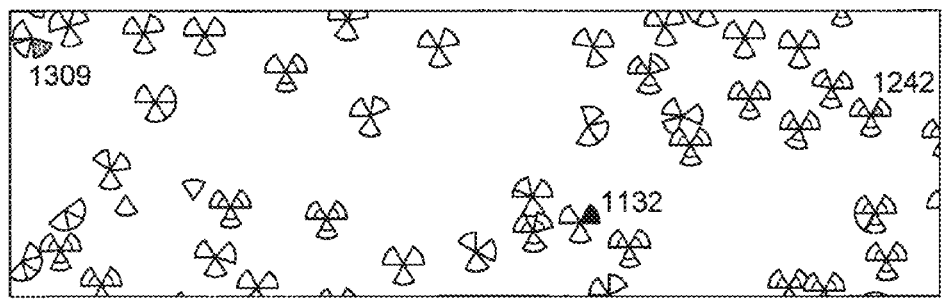
FIG. 12 shows processing apparatus for a computer-based implementation of the method.

Robust SC resolution. Contrary to the distance-based SC resolution that assumes geometry for clarifying uncertainties, the proposed approach, based on analysing relative distance between candidates, is a robust method because it relies on actual network measurements, which can only properly fit the proper candidate. FIG. 12 and Table 2 show that SC=447 has two candidates, sectors 1242 and 1309. By comparing the relative distance between the two candidates (obtained using the method described above) and the reference sector, it is clear that sector 1309 is the correct choice of candidate. However, relying only on physical distance between sectors would have led to a wrong decision.

TABLE 2

Example of Radio Distance Reliance.

| Reference | | Candidate | | |
|---|---|---|---|---|
| SC | Sector | SC | Sector | Relative Distance [chip] |
| 402 | 1132 | 447 | 1242 | 2574 |
| | | 447 | 1309 | 35 |

EXAMPLE 3

Detection of sectors not present in the network topology. If relative distance is not within a reasonable range, it means that there are some missing sectors in the network topology database due to, for instance, insufficient buffer. In Table 3, SC=172 has two candidates: sectors 308 and 1258. Relative distance for the two candidates is far from being reasonable, which indicates that there is a missing sector for SC 172.

TABLE 3

Example of Missing Sectors.

| Reference | | Candidate | | |
|---|---|---|---|---|
| SC | Sector | SC | Sector | Relative Distance [chip] |
| 190 | 842 | 172 | 308 | 16013 |
| | | 172 | 1258 | 19169 |

A further use of the method is detection of SC collisions. When SC planning is badly design it is possible that a terminal measures two different sectors which have the same SC. This is an undesirable situation that leads to SHO failures and potential drops. The situation can be detected by embodiments of this invention noticing that the MR refers to two different sectors with the same SC in different time instants.

In embodiments described above a time-related quantity $T_m$ is reported by terminals and used as the basis for determining timing references and scrambling code resolution. The quantity $T_m$ refers to relative time differences in chips within a frame. It is possible to use a coarser quantity OFF, which refers to an offset (measured in an integer number of frames) of frames within a multi-frame. It is also possible to use a combination of $T_m$ and OFF to derive the relative time difference in chips within a multi-frame.

In an alternative embodiment, it is possible to use a measurement reported by each terminal of an observed time difference between a pair of base stations. This is called SFN-SFN observed time difference in ETSI 125 215, section 5.1.9. The SFN-SFN observed time difference can be used in any of the methods and apparatus described above.

An on-line implementation has been described in detail, where timing references are determined and decisions relating to operation of the wireless network are made in real-time based on the acquired timing reference data. It is also possible to use the method off-line, to check performance of the network. FIG. 3B shows how data is acquired from an Operations Support System (OSS) 51 and a data gateway 52. Functional steps of timing reference recovery and scrambling code resolution are performed by an off-line processing unit 55, using processing tools. The steps are similar, or the same, to those described above for the on-line implementation.

Figure 13:
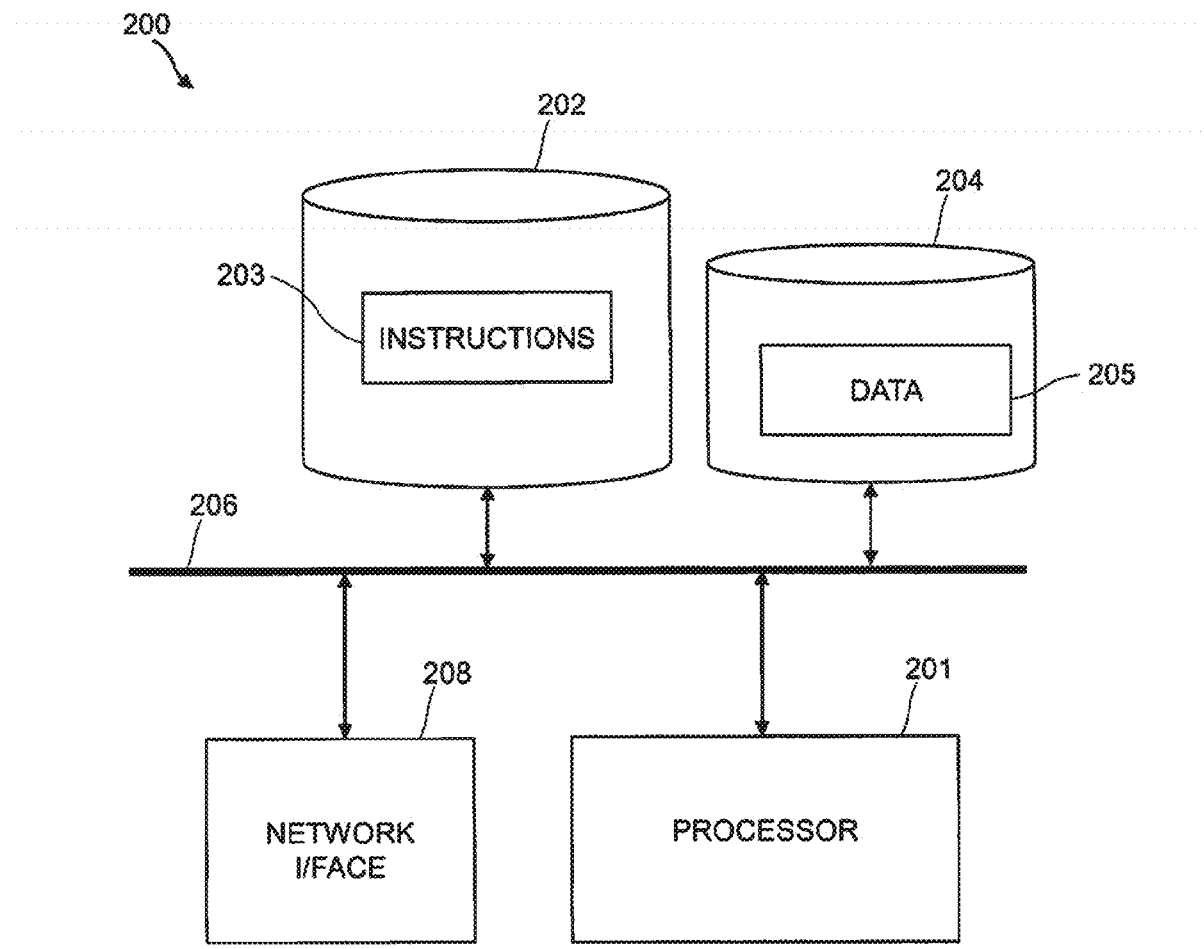
FIG. 13 shows base stations deployed across an area.

FIG. 13 shows an exemplary processing apparatus 200 which may be implemented as any form of a computing and/or electronic device, and in which embodiments of the system and methods described above may be implemented. Processing apparatus 200 can be provided at the wireless terminal 20 or RNC 30. Processing apparatus may implement the method shown in any of FIGS. 7, 8 and 11 or the functionality shown in FIG. 4 or 5. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other network entities.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of processing data reported by wireless terminals in a code division multiple access wireless network, the wireless network comprising a plurality of base stations which operate asynchronously with respect to one another, wherein a set of scrambling codes are allocated to the base stations for scrambling signals transmitted from the base stations, the method comprising, at a node of the wireless network:
   receiving a first type of measurement report from wireless terminals, wherein each first type of measurement report received from one of the wireless terminals comprises an observed time difference measurement acquired by the wireless terminal for a signal received from one of an active set of base stations that currently serve the wireless terminal;
   determining a timing reference for each of the base stations using a plurality of the observed time difference measurements;
   receiving a second type of measurement report from a wireless terminal, the second type of measurement report comprising both:
      an observed time difference measurement acquired by the wireless terminal for a signal received from a base station which is not currently serving the wireless terminal; and
      a scrambling code of the received signal;
   determining an identity of the base station in the second type of measurement report by using:
      the scrambling code of the signal received from the base station which is not currently serving the wireless terminal;
      the observed time difference measurement in the second type of measurement report; and
      the determined timing reference for that base station.

2. The method of claim 1:
   wherein at least one of the base stations is a sectored base station with a different scrambling code allocated to each of the sectors of the sectored base station;
   wherein the determining an identity of the base station in the second type of measurement report comprises determining an identity of a sector of the sectored base station.

3. The method of claim 1, wherein the determining an identity of the base station in the second type of measurement report is performed for a plurality of candidate base stations having the same scrambling code and a determined timing reference for each of the plurality of candidate base stations.

4. The method of claim 3, wherein the determining an identity of the base station comprises:
   determining a relative distance for each candidate base station, where the relative distance is a difference between:
      (i) a distance between the terminal and one base station in the active set;
      (ii) a distance between the terminal and the candidate base station;
   selecting one of the candidate base stations as being the base station most likely to correspond to the base station in the second type of measurement report based on the determined relative distances.

5. The method of claim 1, wherein the determining a timing reference comprises:
   collecting observed time difference measurements over a time period;
   determining an average value of the observed time difference measurements to provide a difference between timing references for respective pairs of base stations;
   determining a timing reference for each of the base stations using the average values of the differences between timing references of the base stations.

6. The method of claim 5, wherein the average value is a median value.

7. The method of claim 1:
   wherein each observed time difference measurement in the first type of measurement report comprises a difference between a signal received from one of the active set of base stations that currently serve the wireless terminal and a local timing reference of the terminal;
   wherein the determining a timing reference comprises:
      collecting observed time difference measurements over a time period;
      determining, for a pair of base stations, a difference between observed time difference measurements for that pair of base stations;
      determining an average value of the difference between observed time difference measurements to provide a difference between timing references for that pair of base stations;
      determining a timing reference for each of the base stations using the average values of the difference between timing references of the base stations.

8. The method of claim 7, wherein the average value is a median value.

9. The method of claim 1, wherein the determining a reference time difference comprises collecting measurements received from a plurality of different wireless terminals.

10. The method of claim 1:
    wherein the following are performed in real-time:
       the receiving the first type of measurement report;
       the determining the timing reference for each of the base stations;
       the receiving the second type of measurement report;
       the determining the identity of the base station in the second type of measurement report;
    further comprising selecting, in real-time, a handoff candidate for terminal based on a result of the determining an identity of the base station.

11. The method of claim 1, wherein the following are performed off-line:
    the receiving the first type of measurement report;
    the determining the timing reference for each of the base stations;
    the receiving the second type of measurement report;
    the determining the identity of the base station in the second type of measurement report.

12. An apparatus for use at a node of a code division multiple access wireless network, the wireless network comprising a plurality of base stations which operate asynchronously with respect to one another, wherein a set of scrambling codes are allocated to the base stations for scrambling the transmissions of the base stations, the apparatus comprising:
    a communications interface configured to:
       receive a first type of measurement report from wireless terminals, wherein each first type of measurement report received from one of the wireless terminals comprises an observed time difference measurement acquired by the wireless terminal for a signal received from one of an active set of base stations that currently serve the wireless terminal;

receive a second type of measurement report from a wireless terminal which comprises both an observed time difference measurement acquired by the wireless terminal for a base station which is not currently serving the wireless terminal and a scrambling code of the received signal;

a processor configured to:
  determine a timing reference for each of the base stations using a plurality of the observed time difference measurements in the first type of measurement report;
  determine an identity of the base station in the second type of measurement report by using:
    the scrambling code of the received signal;
    the observed time difference measurement in the measurement report;
    the determined timing reference for that base station.

13. The apparatus of claim 12:
  wherein at least one of the base stations is a sectored base station with a different scrambling code allocated to each of the sectors of the sectored base station;
  wherein the processor is further configured to determine an identity of a sector of the sectored base station in the second type of measurement report.

14. The apparatus of claim 12, wherein the processor is further configured to determine an identity of the base station in the second type of measurement report for a plurality of candidate base stations having the same scrambling code and a determined timing reference for each of the plurality of candidate base stations.

15. The apparatus of claim 14, wherein the processor is further configured to:
  determine a relative distance for each candidate base station, where the relative distance is a difference between:
    (i) a distance between the terminal and one base station in the active set; and
    (ii) a distance between the terminal and the candidate base station;
  select one of the candidate base stations as being the base station most likely to correspond to the base station in the second type of measurement report based on the determined relative distances.

16. The apparatus of claim 12:
  wherein the apparatus is configured to collect observed time difference measurements over a time period;
  wherein the processor is further configured to:
    determine an average value of the observed time difference measurements;
    determine a timing reference for each of the base stations using the average values of the difference between timing references of the base stations.

17. A code division multiple access wireless network, comprising:
  a plurality of base stations which operate asynchronously with respect to one another, wherein a set of scrambling codes are allocated to the base stations for scrambling the transmissions of the base stations;
  a node having an apparatus comprising:
    a communications interface configured to:
      receive a first type of measurement report from wireless terminals, wherein each first type of measurement report received from one of the wireless terminals comprises an observed time difference measurement acquired by the wireless terminal for a signal received from one of an active set of base stations that currently serve the wireless terminal
      receive a second type of measurement report from a wireless terminal which comprises both an observed time difference measurement acquired by the wireless terminal for a base station which is not currently serving the wireless terminal and a scrambling code of the received signal;
    a processor which is configured to:
      determine a timing reference for each of the base stations using a plurality of the observed time difference measurements in the first type of measurement report;
      determine an identity of the base station in the second type of measurement report by using:
        the scrambling code of the received signal;
        the observed time difference measurement in the measurement report;
        the determined timing reference for that base station.

18. A computer program product stored in a non-transitory computer readable medium for processing data reported by wireless terminals in a code division multiple access wireless network, the wireless network comprising a plurality of base stations which operate asynchronously with respect to one another, wherein a set of scrambling codes are allocated to the base stations for scrambling signals transmitted from the base stations, the computer program product comprising software instructions which, when run on a processor of a node of the wireless network, causes the node to:
  receive a first type of measurement report from wireless terminals, wherein each first type of measurement report received from one of the wireless terminals comprises an observed time difference measurement acquired by the wireless terminal for a signal received from one of an active set of base stations that currently serve the wireless terminal;
  determine a timing reference for each of the base stations using a plurality of the observed time difference measurements;
  receive a second type of measurement report from a wireless terminal, the second type of measurement report comprising both:
    an observed time difference measurement acquired by the wireless terminal for a signal received from a base station which is not currently serving the wireless terminal; and
    a scrambling code of the received signal;
  determine an identity of the base station in the second type of measurement report by using:
    the scrambling code of the signal received from the base station which is not currently serving the wireless terminal;
    the observed time difference measurement in the second type of measurement report; and
    the determined timing reference for that base station.

* * * * *